March 8, 1966   A. A. ASHTON ETAL   3,239,249
SWIVEL JOINTS
Filed April 15, 1963   3 Sheets-Sheet 1
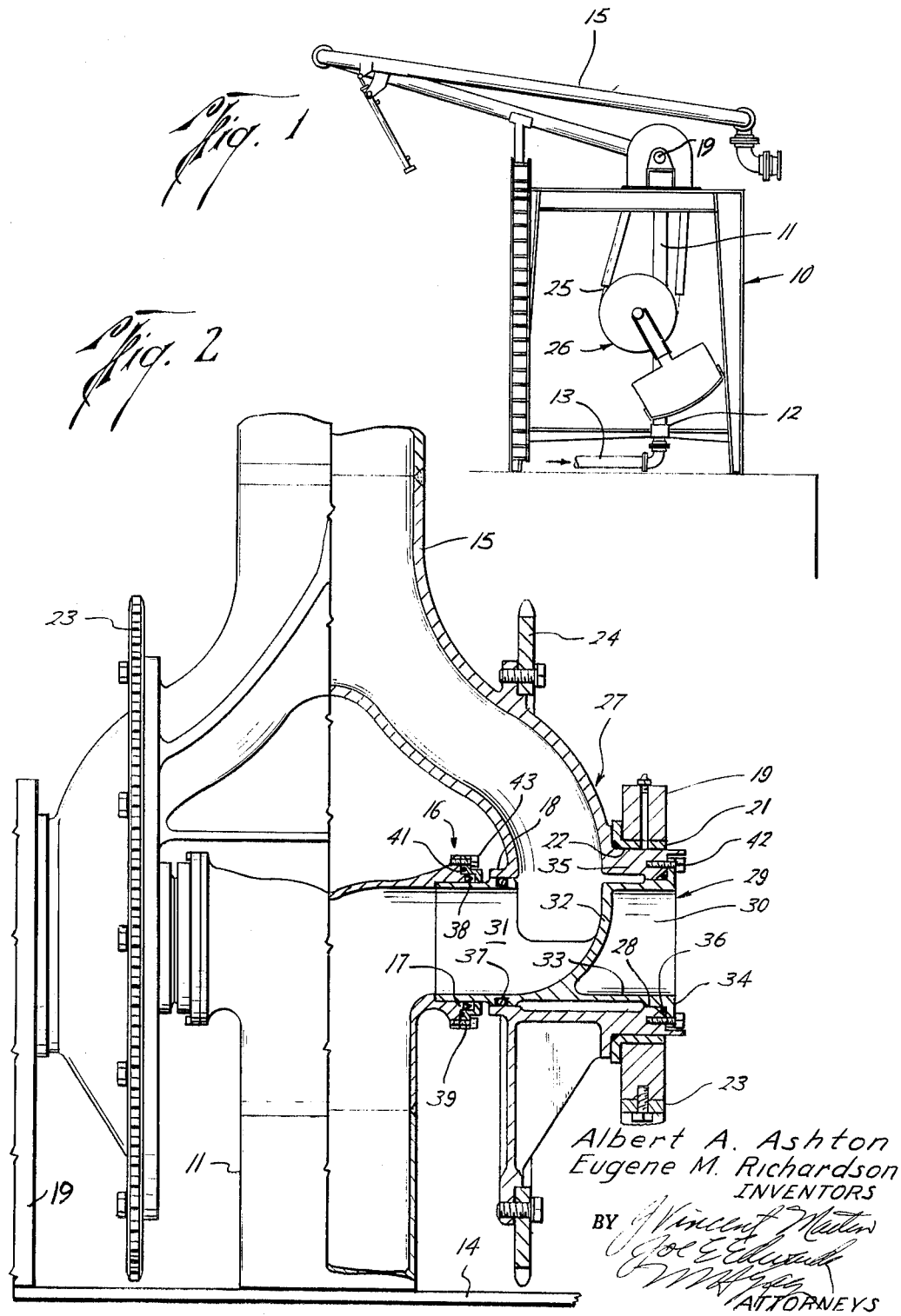
Albert A. Ashton
Eugene M. Richardson
INVENTORS
BY
ATTORNEYS

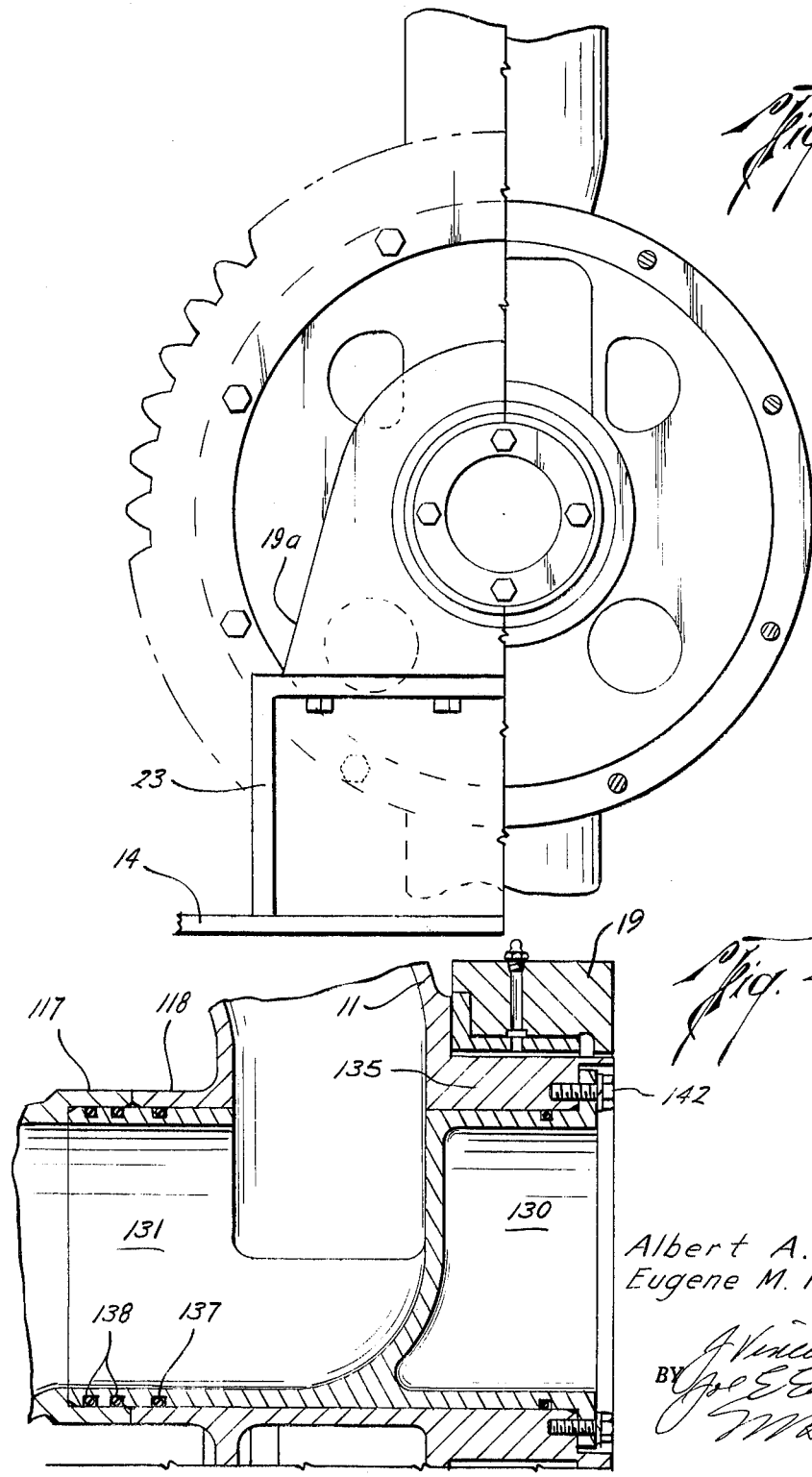

March 8, 1966  A. A. ASHTON ETAL  3,239,249
SWIVEL JOINTS

Filed April 15, 1963  3 Sheets-Sheet 3

Albert A. Ashton
Eugene M. Richardson
INVENTORS

BY
ATTORNEYS 3,239,249
SWIVEL JOINTS
Albert A. Ashton, Dallas, and Eugene M. Richardson, Houston, Tex., assignors to The Youngstown Sheet and Tube Company, Boardman, Ohio, a corporation of Ohio
Filed Apr. 15, 1963, Ser. No. 273,246
1 Claim. (Cl. 285—152)

This invention relates to swivel joints, and more particularly to a manner of sealing between relatively rotating pipe in which the seal means may be easily replaced without disturbing the relationship of the pipe.

In releasing the seals in large swivel joints, considerable difficulty is encountered due to the weight of the pipes. For instance, in loading arm installations the loading arms are very heavy and, if the loading arm must be removed to replace the seal between it and the supply pipe, mechanical hoisting equipment is necessary.

It is an object of this invention to provide a simple, easily replaced seal between two relatively rotatable pipes which may be easily replaced without disturbing the two pipes.

Another object is to provide a swivel joint between two pipes in which the space between the two pipes is bridged by a sealing insert which can be removed and replaced without movement of the two pipes.

A particular object is to provide a swivel joint between the loading arm and supply pipe of a loading installation in which the seal between the supply pipe and loading arm can be replaced without moving either the supply pipe or loading arm.

Another object is to provide a swivel joint seal which may be replaced without disturbing either pipe of the swivel joint in which the seal is of the type having long life under conditions of sealing between two relatively rotating members.

Other objects, features and advantages of this invention will be apparent from the drawings, the specifiication and the claims.

In the drawings, wherein like reference numerals indicate like parts, and wherein illustrative embodiments of this invention are shown:

FIGURE 1 is a view in side elevation of a loading arm apparatus embodying this invention;

FIGURE 2 is a view partly in elevation and partly in cross section through the swivel connection between the supply pipe and loading arm of the device of FIGURE 1;

FIGURE 3 is a view in side elevation with parts broken away of the portion of the loading arm assembly shown in FIGURE 2;

FIGURE 4 is a sectional view through a modified form of the device shown in FIGURES 1 through 3;

Figure 5:
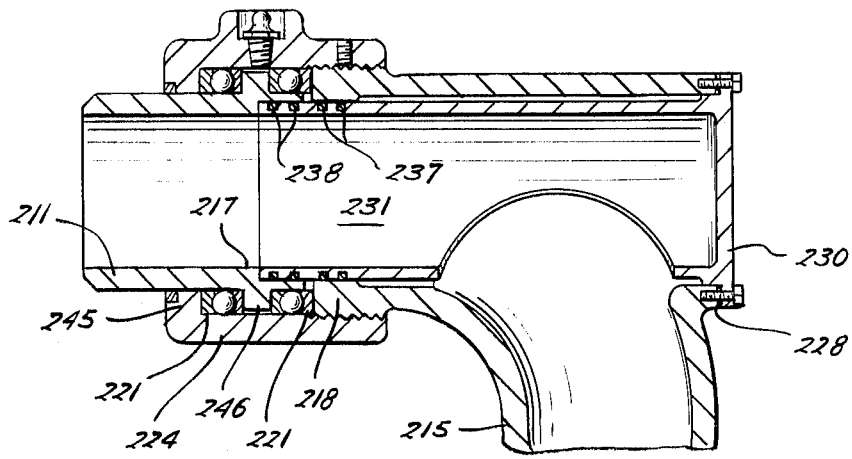
FIGURE 5 is a view in section through a swivel joint embodying this invention; and, FIGURE 6 is a view in cross section through a modified form of swivel joint embodying this invention.

FIGURE 1 shows a marine loading arm assembly. The assembly includes a platform indicated generally at 10. This platform supports a supply pipe 11 which is connected by a swivel joint 12 to a pipe 13 which is in turn connected to the source of supply of liquid. The supply pipe 11 is attached to the rotary table 14 so that the supply pipe and loading arm may rotate about a vertical axis.

A two-piece loading arm 15 provides a delivery pipe which is connected to the supply pipe by a swivel joint indicated generally at 16 which permits swinging movement of the delivery pipe about a horizontal axis.

Bearing means are provided for supporting the delivery pipe for swinging movement about the central axes of the supply pipe outlet 17 and the delivery pipe inlet 18. This bearings means includes a doughnut 19 having press-fitted therein a bronze bushing 21 which engages the journal surface 22 provided integral with the delivery pipe 15. The doughnut 19 is generally circular in configuration except at its base where it is flared out and flattened on bottom to provide a foot 19a which is supported upon and attached to the bearing support 23. The bearing support 23 is supported upon the turntable 14.

The delivery pipe carries a pair of sprockets 24. Chains 25 are trained over these sprockets and the counterbalance mechanism indicated generally at 26.

From FIGURE 2 it is apparent that the supply pipe has a Y at its outlet end. The two swivel and bearing assemblies are identical and only one will be explained herein.

One of the delivery and supply pipes has an access port therein. Where a Y-type delivery pipe is used, it is preferred that this access port be in the delivery pipe. The delivery pipe has a sharp bend therein indicated generally at 27 which is immediately adjacent the inlet 18 of the delivery pipe. Preferably this access port is in the bend 27 and is provided by the port 28.

Cap means are provided for sealing said port 28 and in the form shown in FIGURE 2 is provided by one end of the member indicated generally at 29. The member 29 includes the cap 30 and the insert 31. In this form the cap is provided by the liquid-directing wall 32 of member 29, the annular wall 33, and the flange 34 at the end of annular wall 33 which is secured to the journal 35 which carries the bearing surface 22 and is an integral portion of the delivery pipe 15. A suitable seal 36 completes the cap means.

The tubular insert 31 is insertable into and retrievable from the delivery pipe through the access port 28 and extends between the supply pipe outlet 17 and the delivery pipe inlet 18. As shown, the insert itself preferably bridges the space between the outlet 17 and inlet 18. As the insert 31 is integral with the cap 30, it will rotate with rotation of the delivery pipe 15.

Seal means are provided between the insert 31 and each of the supply and delivery pipes. In FIGURE 2 the seal means between the delivery pipe and the insert is provided by an O-ring 37 which seals between the delivery pipe and the insert. The seal means between the supply pipe and insert is provided by a seal element 38 and a retainer 39. The axial dimension of each of the seal element 38 and retainer 39 should be such that when the insert 31 is removed the seal element and retainer can be moved radially in the space between the outlet 17 and the inlet 18 and lifted free from the supply and delivery pipes. In the particular form shown in FIGURE 2, it is apparent that the seal element 38 is carried within the retainer 39, and therefore the combined axial dimension of these two members should be less than the space between the outlet 17 and the inlet 18. It will be noted that the seal element 38 is of the type having lip seals exposed to pressure within the pipes. This type of seal will give superior performance in sealing against the rotating insert 31. An O-ring 41 seals between the retainer 39 and the supply pipe to complete the seal assembly.

When it is desired to replace the seal means between the insert 31 and the supply and delivery pipes, it is only necessary to remove the cap bolts 42 from cap 30 to withdraw and remove the insert 31 from both the delivery and supply pipes. With the insert removed, the retainer bolts 43 may be removed and the seal retainer 39 and seal elements 38 moved radially to a position clear of the supply and delivery pipes. Either or both of the seal elements 37 and 38 may be replaced and the apparatus reassembled in reverse manner.

An alternate form of this invention is shown in FIGURE 4. In this form, the supply pipe outlet 117 and the delivery pipe inlet 118 are closer together. The insert 131 carries seal elements for sealingly engaging the outlet 117 and the inlet 118. A single O-ring 137 seals between the insert and the delivery pipe inlet. A pair of O-rings 138 provide the seal between the insert and the supply pipe. Again, the cap 130 is secured to the journal 135 of delivery pipe 115 by studs 142 so that the seal elements 138 provide a rotating seal with the supply pipe outlet 117.

Figure 6:
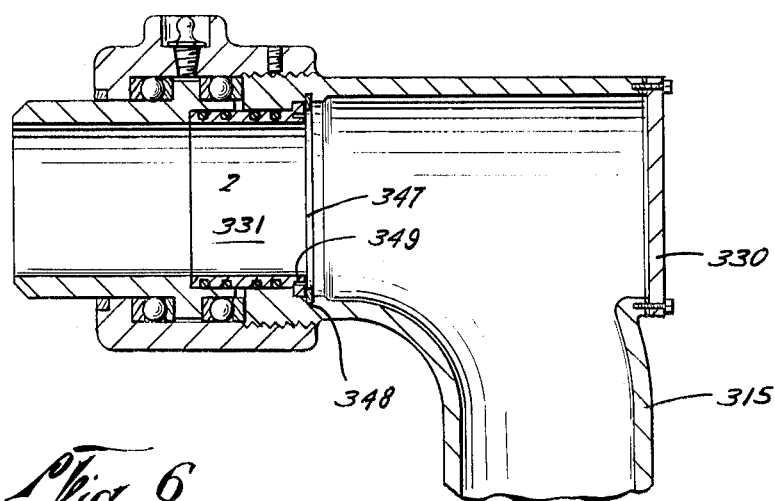

Referring now to FIGURES 5 and 6, this invention is shown applied to swivel joints of the type used to couple two pipes together for general service. As flow may be in either direction through the swivel joint, either pipe may be considered the supply pipe. For simplicity of disclosure, pipe 211 will be considered the supply pipe and pipe 215 will be considered the delivery pipe. The inlet end 218 of the delivery pipe is threaded exteriorly and a nut 224 has internal threads for cooperation therewith. The end of nut 244 which is unthreaded has an inturned flange 245 which cooperates with an out-turned flange 246 on the outlet end 218 of the supply pipe in securing the two pipes together. Bearing means is provided by a pair of ball bearing assemblies 221 arranged on opposite sides of flange 246. The structure just described provides for relative rotation of the supply and delivery pipe, outlet and inlet respectively, about a common axis.

In accordance with this invention, one of the supply and delivery pipes is provided with an access port for insertion and removal of an insert and seals. In the form illustrated, the access port 228 is provided in a sharp bend of the delivery pipe 215. A combined cap 230 and insert portion 231 functions in substantially the same manner as the cap and insert shown in FIGURE 4. The insert end 231 of the combined cap-insert carries seal elements for sealing with the delivery pipe 215 in the form of a pair of O-rings 237. In like manner, a pair of O-rings 238 sealingly engage the outlet of the supply pipe 211.

FIGURE 6 is identical with FIGURE 5 except that the cap 330 is separated from the insert 331. Also, means are provided for holding the insert in place and may take the form of a snap ring 347 fitting in a groove 348 in the delivery pipe 315. For convenience in removing the insert 331 after the snap ring has been removed, a plurality of puller holes 349 are provided for attaching a puller to the insert.

The foregoing disclosure and description of the invention is illustrative and explanatory thereof, and various changes in the size, shape and materials, as well as in the details of the illustrated construction, may be made within the scope of the appended claim without departing from the spirit of the invention.

What is claimed is:

Apparatus comprising,
a platform,
a supply pipe having an axis and supported wholly by said platform and having at least one outlet laterally offset from said axis,
a delivery pipe having an axis and an inlet laterally offset from said axis,
a bearing boss on said delivery pipe,
bearing means on said platform engaging and supporting said delivery pipe on said boss directly from said platform for swinging movement about a junction axis of the supply pipe outlet and the delivery pipe inlet, said bearing means and boss being coaxial with said junction axis, said bearing supporting the full load of said delivery pipe independently of said supply pipe,
an access port in one of the delivery and supply pipes and coaxial with said boss,
cap means sealing said access port,
a non load-bearing tubular insert extending between said supply pipe outlet and said delivery pipe inlet, said insert being freely insertable and retrievable through said access port and completing the fluid path between said supply and delivery pipes,
and seal means between said insert and each of said supply and delivery pipes.

References Cited by the Examiner
UNITED STATES PATENTS

| | | | |
|---|---|---|---|
| 1,092,390 | 4/1914 | Ramsey | 285—151 |
| 1,988,385 | 1/1935 | Kiel | 285—274 |
| 2,210,088 | 8/1940 | Longfield | 285—190 X |
| 2,481,404 | 9/1949 | Donner. | |
| 2,678,102 | 5/1954 | Freeman | 285—152 |
| 2,943,868 | 7/1960 | Hanback. | |

CARL W. TOMLIN, *Primary Examiner.*